Feb. 21, 1967  J. DOLZA  3,304,924
TENSIONING PULLEY
Filed Jan. 20, 1964

INVENTOR.
John Dolza
BY
Barnard, McGlynn & Reising
ATTORNEYS

Feb. 21, 1967  J. DOLZA  3,304,924
TENSIONING PULLEY

Filed Jan. 20, 1964

INVENTOR.
John Dolza
BY
Barnard, McGlynn & Reising
ATTORNEYS

Feb. 21, 1967

J. DOLZA 3,304,924

TENSIONING PULLEY

Filed Jan. 20, 1964

INVENTOR.
John Dolza
BY
Barnard, McGlynn & Reising
ATTORNEYS

Feb. 21, 1967    J. DOLZA    3,304,924
TENSIONING PULLEY
Filed Jan. 20, 1964    4 Sheets-Sheet 4

INVENTOR.
John Dolza
BY
Barnard, McGlynn & Reising
ATTORNEYS

United States Patent Office 3,304,924
Patented Feb. 21, 1967

3,304,924
TENSIONING PULLEY
John Dolza, 810 State St., Fenton, Mich. 48430
Filed Jan. 20, 1964, Ser. No. 338,922
38 Claims. (Cl. 123—90)

This invention relates to an improved mechanism for transmitting rotary motion from one rotary member to another laterally spaced rotary member. The invention has particular utility as the connection between the crankshaft and the camshaft, or camshafts, and/or other other accessories in an internal combustion engine, and will be described in detail with reference to this particular embodiment thereof; however, it will be understood that the improved mechanism can be used in many other devices, systems, and environments.

In all conventional reciprocating type internal combustion engines, the camshaft which imparts reciprocating motion in timed sequence to the intake and exhaust valves is driven by means of a gear on the camshaft connected by a chain or belt to a gear on the crankshaft. It is, of course, very important that the chain connection between the gears be tight since any slack in the chain leads to torsional oscillation of the camshaft, timing variations and valve mechanism noises. If slack is excessive, whipping of the chain with associated gear tooth wear can result, along with the hazard that the chain will disengage from the gears. Because of the inevitable slight variations in chain and gear sizes, and in gear spacing resulting from normal manufacturing tolerance, it is difficult, if not impossible, to accomplish the chain tautness required without incorporating some special means or mechanism for accomplishing it. This problem of maintaining a taut chain connection between the gears is further complicated by the fact that the crankshaft and the camshaft are mounted on a common support, generally the engine block, and as the engine temperature fluctuates, as from a cold engine to a hot engine, the axial spacing between the shafts undergoes variation due to metal expansion and contraction. Hence, while the chain connection might be taut when the engine is hot, it would normally become slack when the engine is cool due to slight contraction of the engine block.

One obvious solution to the problem would be to use an elastic chain instead of one of fixed length, such that its inherent elasticity would maintain it taut at all times. However, this is disadvantageous for the reason that an elastic chain inherently lacks various essential properties, most important tensile strength, and greatly increases the wear rate of plastic elastomeric type of chain or toothed belts. The stock solution to the problem, which is in common use at the present time, is to use an idler gear or other tensioning device which biases against the chain to maintain it taut. This has two major disadvantages. First, it increases the noise produced by the mechansim during engine operation, since with each additional gear-to-chain connection the noise level becomes greater. Secondly, it is expensive because it requires additional, relatively costly parts.

In copending United States patent application Serial No. 258,763, filed Feb. 15, 1963, now Patent No. 3,216,267, in the name of John Dolza, copending United States application Ser. No. 275,329, filed Apr. 24, 1963, now Patent No. 3,200,659, in the name of Sergio Angelini, and copending United States application Ser. No. 275,286, filed Apr. 24, 1963, now Patent No. 3,183,731, in the name of John Dolza, there is disclosed and claimed a rotary motion transmitting mechanism of the type described wherein the chain is maintained taut by constructing one of the gears with a hub and rim and incorporating a resilient connection between the hub and the rim whereby the hub can assume a position eccentric to the rim.

A fundamental objective of this invention is the provision of a mechanism for transmitting drive between a pair of rotary members mounted on generally parallel and spaced shafts wherein variations in the distance between the shafts may be accommodated without introducing torsional oscillations or variations between the rotary members. In other words, the present mechanism provides a rotary motion transmitting drive train in which there is substantially no torsional wrap-up or relative torsional movement between the rotary members and at the same time permitting variations in the center distance displacement in the rotative axes of such members.

A further and specific object is the provision of an improved and simplified mechanism for transmitting rotary motion from the crankshaft to the camshaft so as to maintain proper valve timing even though the center distance between said shafts may vary.

Still another object is the provision of an improved rotary member particularly useful in rotary motion transfer mechanisms in which center distances between coacting rotary axes are variable.

A still further object is a drive in which the same belt or chain is actuating two or more rotary pulleys and one or some of them can be adjusted to accommodate some of the manufacturing variations, by producing and maintaining the desired belt or chain tension notwithstanding assembly variations, wear, thermal expansion or the like, even though the belt or chain has low elastic stretch.

Briefly, these objects are accomplished by constructing one or both of the gears, or other rotary members, with a hub, a rim, and integral resilient means connecting the hub and rim such that an eccentric relationship can exist between the hub and the rim. Hence, an extremely strong nonelastic chain can be used and without need for a chain biasing idler gear mechanism. The resilient connection between the hub and rim maintains the chain taut at all times irrespective of slight variations in the spacing between the axes of rotation of the gears.

It is a more specific object of the present invention to provide an improved rotary motion transmitting mechanism of the type disclosed in the aforesaid patent applications. More specifically, this invention has as one of its objects the provision of an improved mechanism of the type described where the resilient connection between the hub and the rim of one of the gears, or other rotary members, comprises an integral elastic portion greatly limiting the angular movement of the rim with respect to the hub while allowing center distance resiliency of the rim with respect to the hub. This is accomplished through compression-tension radial resiliency, thereby permitting the desired spring biased eccentricity between the hub and rim during rotation. Hence, the chain is maintained taut at all times by reason of the elastic connection in one gear, and yet there is no excessive tendency for the rim to move angularly with respect to the hub.

The above and other objects, features, and advantages of the invention will appear more clearly from the following detailed description thereof made with reference to the appended drawings in which.

Figure 1:
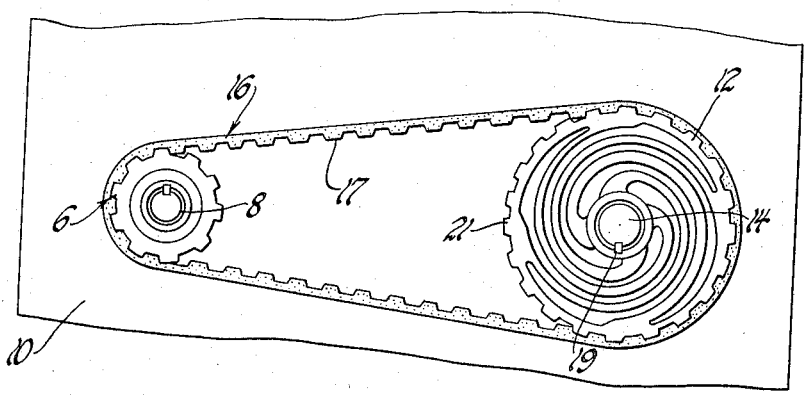
FIGURE 1 is a front view of an embodiment of the invention showing a relatively small driving gear connected to the crankshaft of an engine, a large driven gear connected to the engine camshaft, and a toothed belt or chain connection between the two.

Referring now to FIGURE 1, the mechanism shown comprises a relatively small driving gear 6 secured to the end of crankshaft 8 which is rotatably supported by the metal engine block indicated at 10, a relatively large driven gear 12 secured to the end of the camshaft 14 which extends parallel to the crankshaft and which is also rotatably supported by the metal engine block 10, and a taut strong nonstretching continuous belt or chain 16 having teeth 17 engaging and interconnecting the driven gears to transmit the rotary motion of the one to the other. Since the chain can be of substantially fixed length, requiring no elasticity, its construction should preferably be such as to provide optimum tensile strength. In the embodiment shown, the chain is formed of a cloth-organic polymer laminated material with the teeth molded therein and with imbedded continuous strands of metal wire or glass fiber to impart the high tensile strength. Such a chain has the advantage of being relatively noiseless as compared to a metal link chain.

Figure 2:
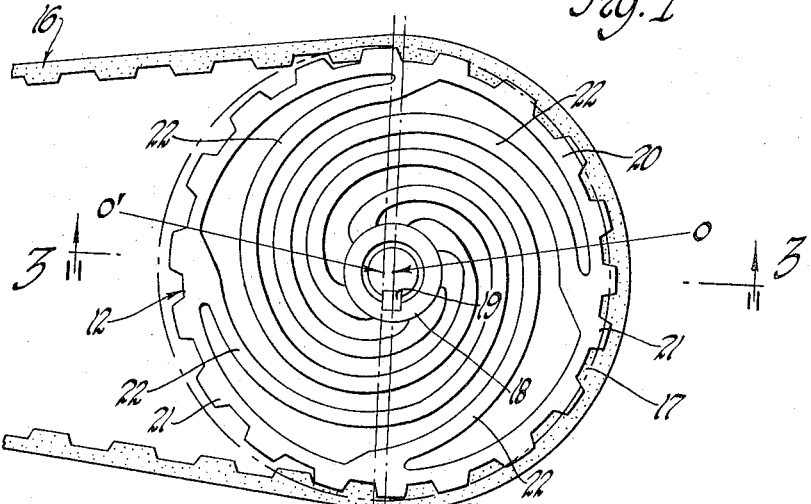
FIGURE 2 is an enlarged elevational view of the driven gear shown in FIGURE 1.

FIGURE 2 best shows the driven gear 12 which is provided with a hub 18 secured to the camshaft 14 by a key 19. A rim 20 has its outer periphery formed with a plurality of gear teeth 21 adapted to mate and engage with the teeth 17 on the chain 16, and which is secured to the hub by a series of integral spiral spokes 22. The spiral shape of the spokes provides the elastic length for the desired radial flexibility of the rim 20 in relation to the hub 18.

The pulley 12 may be formed of any suitable material having the desired radial flexibility or degree of radial deflection as between the rim 20 and the hub 18. Such material must be capable of being easily formed into the required shape, and it is desirable that as little machining or other manufacturing operations as possible be required. Other desirable parameters include the lack of any requirement of surface treatment on the teeth 21, excellent wearability of the teeth 21 so as to provide the best belt wear possible, and a relatively low thermal expansion coefficient. In actual embodiments of the invention it has been found that ductile iron, aluminum, or plastic materials are satisfactory for forming the pulley 12. Such plastic material may be a single composition or may be a combination of materials, such, for example, as a nylon rim with spokes and hub formed of a glass-filled phenolic material. Such construction may be easily formed with any well known plastic molding method or process. Other types of plastic materials are suitable, it being noted that with the plastic material particularly, utilization of injection molding processes, or the like, may eliminate all machining operations following the formation of the basic unit.

Figure 3:
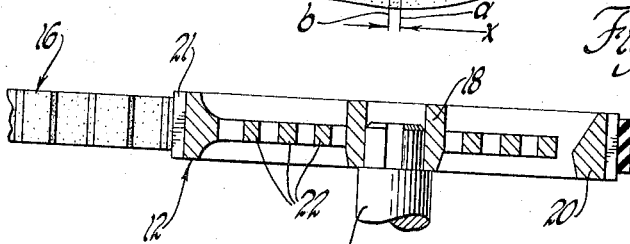
FIGURE 3 is a cross sectional view of the driven gear of FIGURES 1 and 2, taken substantially along the line 3—3 of FIGURE 2 and looking in the direction of the arrows.
Figure 4:
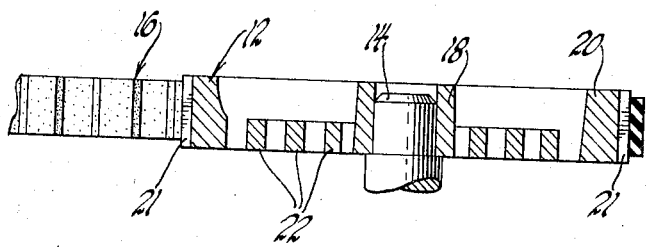
FIGURE 4 is a cross sectional view of a modification of the driven gear of FIGURES 1–3, taken substantially along the same line as that of FIGURE 3.
Figure 5:
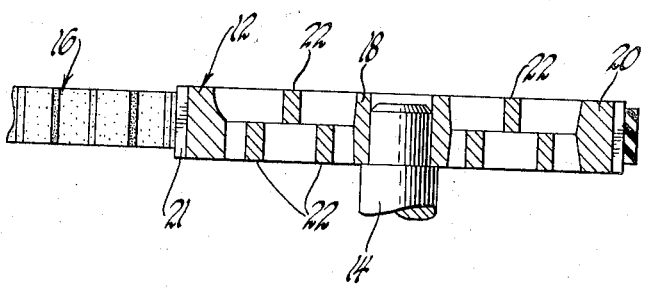
FIGURE 5 is a cross sectional view of another modification of the driven gear of FIGURES 1–3, taken substantially along the same line as that of FIGURE 3.

In manufacturing the pulley 12, and depending upon the material used, the basic structure is formed by casting or molding with the relative location of the rim, spokes, and hub being variable to suit the casting or molding process. For example, as shown in FIGURE 3, the spiral spokes 22 may be disposed in the central plane of the hub 18 and rim 20. The modification shown in FIGURE 4 illustrates the same spiral spokes 22 arranged so that one of their faces is flush with the rim 20, thus facilitating cleaning of the casting from the mold parting fins. In FIGURE 5 a third modification is shown in which the spokes 22 are arranged in two different planes to facilitate casting with sand of low mechanical strength. These three examples are not intended to limit the design of the invention but to illustrate the adaptability to various casting processes. In any case, the spiral form of the spokes 22 provides sufficient torsional rigidity to torque the transmission by the device.

Referring now to FIGURE 2, it should be noted that in the manufactured condition, and with no chain or belt tension on the pulley 12, rim 20 and hub 18 are concentric with center O on vertical axes $a$. However, when chain 16 is assembled on the gears, the chain will exercise a tension and displacing the center of rim 20 to O' on the vertical axes $b$, eccentric by the amount $x$ from center O.

This eccentric position of the rim and the resulting deflection of the spiral spokes is indicated by the dashed and dotted lines in FIGURE 2. The number of spokes and their equal angular spacing at the periphery of the rim 20 and hub 18 is such as to insure uniform radial elasticity and dynamic balance to the pulley, providing vibration-free rotation.

In operation, the chain 16 is assembled to the gears in a taut condition when the engine is cold and hence has no slack prior to or during engine warm-up. The elastic spokes connecting the hub 18 and the rim 20 of the pulley assure chain tautness irrespective of minor variations in part size, spacing due to manufacturing tolerances and the like.

As assembled, the rotative axis $a$ of hub 18 is offset from the rotative axis $b$ of rim 20 in initial amount $x$. Distance or amount $x$ is determined by pretensioning the chain to approximately or slightly greater than the maximum tangential pulsating force introduced into the chain by engine operation, or to the tension required to produce the minimum desired belt vibration frequency. For instance, and with a particular engine, fifty pounds of preload between members 6 and 12 will equal or exceed slightly the maximum tangential force required to overcome the peak torque reaction of the cam on the camshaft 14. Unless such pretensioning of member 12 is undertaken, the pulsating tangential force variously introduced into chain 16 would start member 12 "bouncing."

The axis offset $x$ of rim 20 is in the opposite direction of thermal expansion of the block 10 as the block becomes heated. In other words, as the engine heats, camshaft 14 moves away from crankshaft 18 and and the distance $x$ will become larger, thereby increasing the eccentricity. At the same time, due to the essential nonelasticity of belt or chain 16, rim 20 will remain in its same spatial relationship with respect to drive gear 6. This initial and controlled eccentricity insures that the direction of eccentricity is always the same even though the magnitude may vary. This relationship further enhances stability of the drive system, including its ability to transmit drive between members 6 and 12 without torsional oscillations.

Since some drives are subject to resonance excitations within their speed range, it may be desirable to provide damping means to absorb torsional or radial vibrations.

Figure 6:
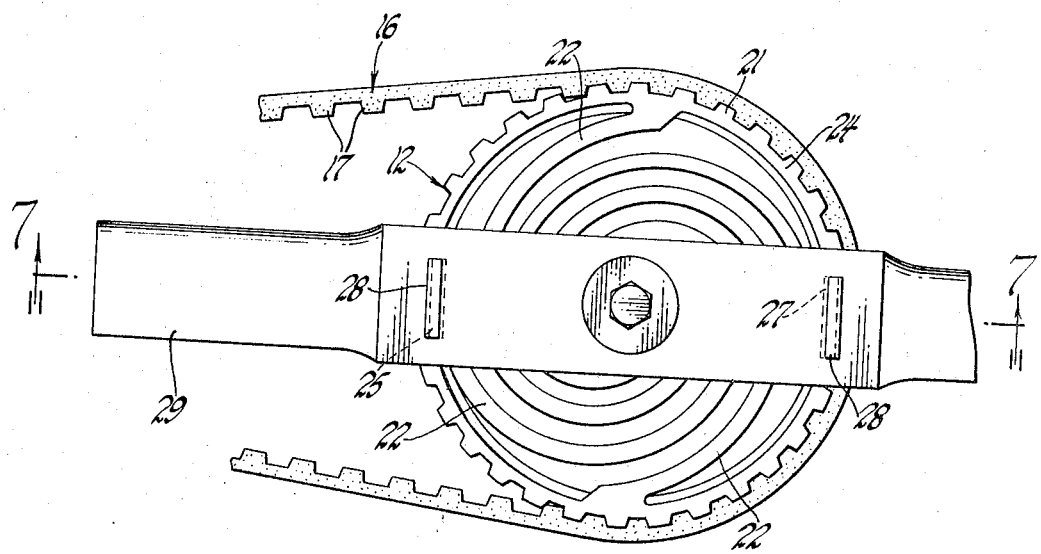
FIGURE 6 is an elevational view of yet another modification of the driven gear of FIGURES 1–3 and including damping means combined therewith.

Reference is now made to FIGURE 6 illustrating a damper consisting of a radial member 23 fastened to the hub 18 and in frictional contact with the rim 20 or areas in the vicinity of the rim of the pulley 24. These friction contacts may be pads of lining material 25 set into suitable recesses 26 of the rim 20 and rubbing against member 23.

Since there is relative motion at each revolution, pads 25 will absorb a very small amount of frictional energy which increases when the system vibrates and provides the damping necessary to control the belt or chain vibration within permissible amplitude in the sense of noise emission and additional stresses caused by the vibrations.

It has been found desirable to incorporate an adequate polar moment of inertia to the camshaft to limit the angular velocity variation of the camshaft due to the inherent torque pulsation caused by the cams. This will limit the required amount of damping and the energy loss and cooling requirement at the friction surfaces 27.

Figure 7:
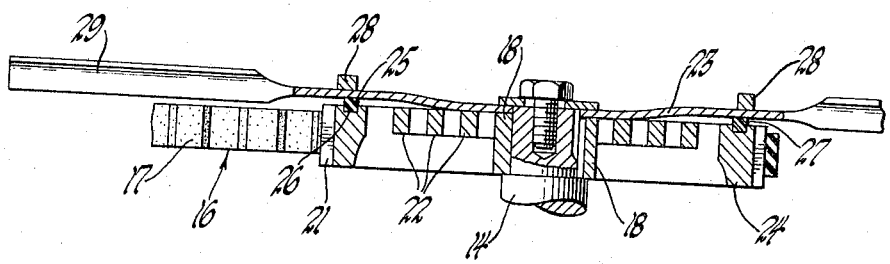
FIGURE 7 is a cross sectional view of the modification shown in FIGURE 6, taken substantially along the line 7—7 of FIGURE 6 and looking in the direction of the arrows.
Figure 8:
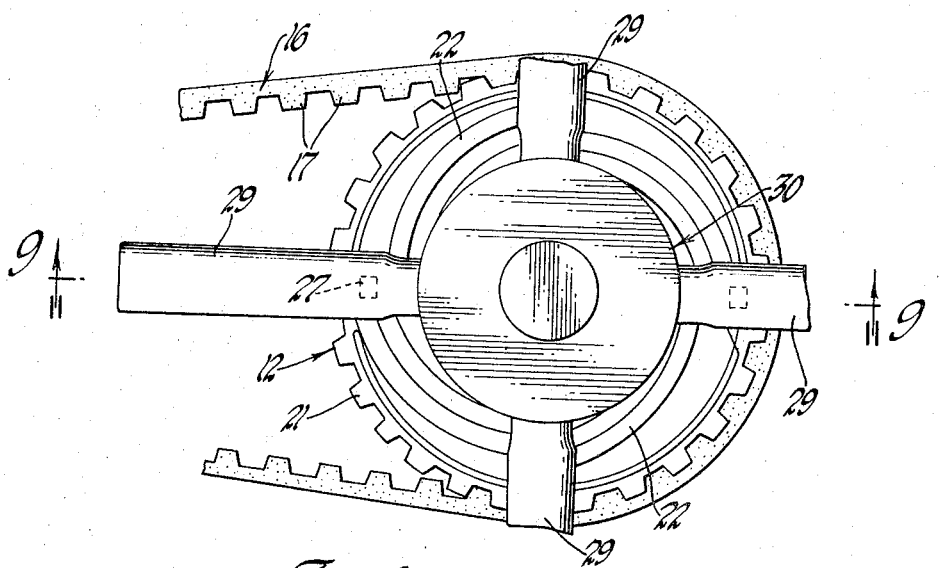
FIGURE 8 is an elevational view of still another modification of the driven gear of FIGURES 1–3 and including a fan coupled to the camshaft through a thermostatically operated clutch.
Figure 9:
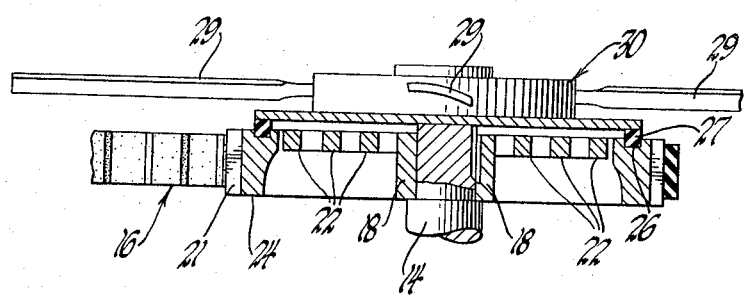
FIGURE 9 is a cross sectional view of the modification of FIGURE 8, taken substantially along the line 9—9 of FIGURE 8 and looking in the direction of the arrows.

This additional polar moment of inertia may be achieved by weights 28, FIGURE 6, or by combining member 27 with one of the accessories having a relevant polar moment of inertia and operable at camshaft speed. For example, the fan 29 may be used for this purpose, being mounted directly on the camshaft, as shown in FIGURES 6 and 7, or indirectly through a thermostatic clutch 30, as shown in FIGURES 8 and 9. In the latter case the thermostatic clutch driving member is the permanent mass added to the crankshaft, the clutch housing and fan being operative only when the fan is clutched in. It will be apparent that the additional polar moment of inertia means may be added to either the rim 24 or to the hub 18 in view of the resiliency of the spiral spokes 22.

Thus, a tensioning pulley is provided which is relatively simple to manufacture and assemble and which will maintain the chain or belt in a taut condition at all times by reason of the elastic connection between the hub and the rim of the device. Variations in manufacturing tolerances, wear, or thermal conditions in the engine which tend to change the distance between the rotary members are easily and efficiently accommodated. The device is readily adaptable to various engine designs as well as utilizing other engine accessories to provide optimum operation of the drive transmission.

Modifications and alterations will readily occur to those having skill in the art after having had reference to the foregoing description and drawings. However, it is not intended to limit the invention by the foregoing description and drawings, such being only a preferred embodiment of the invention, but by the scope of the appended claims in which I claim:

1. A rotary motion transmitting mechanism comprising:
   a first rotary member;
   a second rotary member having an axis of rotation spaced from the axis of rotation of said first rotary member;
   a closed flexible loop of substantially fixed length interconnecting said rotary members to transmit the rotary motion of one of said rotary members to the other of said rotary members;
   at least one of said rotary members having a hub, a rim, and a resilient connection between said hub and said rim to permit eccentricity between said hub and said rim during rotation thereof;
   and damping means between said hub and said rim and operable to absorb vibrations therein.

2. The mechanism set forth in claim 1 wherein said damping means includes an elongate member secured to said hub and extending radially outwardly therefrom, and friction means secured in said rim and engaging said elongate member.

3. The mechanism set forth in claim 1 wherein said one of said rotary members is formed of a plastic material.

4. The mechanism set forth in claim 1 wherein the elements of said one of said rotary members are formed of a plurality of differing plastic materials integrated during the manufacture thereof.

5. A rotary motion transmitting mechanism comprising:
   a first rotary member;
   a second rotary member having an axis of rotation spaced from the axis of rotation of said first rotary member;
   a closed flexible loop of substantially fixed length interconnecting said rotary members to transmit the rotary motion of one of said rotary members to the other of said rotary members;
   at least one of said rotary members having a hub, a rim, and means integral with said hub and said rim and capable of radial deflection to permit eccentricity between said hub and said rim during rotation thereof;
   and damping means between said hub and said rim and operable to absorb vibrations therein.

6. The mechanism set forth in claim 5 wherein said damping means includes an elongate member secured to said hub and extending radially outwardly therefrom, and friction means secured in said rim and engaging said elongate member.

7. A rotary motion transmitting mechanism comprising:
   a first rotary member;
   a second rotary member having an axis of rotation spaced from the axis of rotation of said first rotary member;
   a closed flexible loop of substantially fixed length interconnecting said rotary members to transmit the rotary motion of one of said rotary members to the other of said rotary members;
   at least one of said rotary members having a hub, a rim, and at least one spiral member integral with said hub and said rim and wound therebetween and capable of radial deflection to permit eccentricity between said hub and said rim during rotation thereof;
   and damping means between said hub and said rim and operable to absorb vibrations therein.

8. The mechanism set forth in claim 7 wherein said damping means includes an elongate member secured to said hub and extending radially outwardly therefrom, and friction means secured in said rim and engaging said elongate member.

9. A rotary motion transmitting mechanism comprising:
   a first rotary member;
   a second rotary member having an axis of rotation spaced from the axis of rotation of said first rotary member;
   a closed flexible loop of substantially fixed length interconnecting said rotary members to transmit the rotary motion of one of said rotary members to the other of said rotary members;
   at least one of said rotary members having a hub, a rim, and a plurality of spiral spoke members integral with said hub and said rim and wound therebetween, said spoke members being capable of radial deflection to permit eccentricity between said hub and said rim during rotation thereof;
   and damping means between said hub and said rim and operable to absorb vibrations therein.

10. The mechanism set forth in claim 9 wherein said damping means includes an elongate member secured to said hub and extending radially outwardly therefrom, and friction means secured in said rim and engaging said elongate member.

11. A rotary motion transmitting mechanism comprising:
    a first rotary member;
    a second rotary member having an axis of rotation spaced from the axis of rotation of said first rotary member;

and a closed flexible loop of substantially fixed length interconnecting said rotary members to transmit the rotary motion of one of said rotary members to the other of said rotary members;

at least one of said rotary members having a hub, a rim, and means integral with said hub and said rim and capable of radial deflection to permit eccentricity between said hub and said rim during rotation thereof;

and means connected to said hub for providing additional inertia thereto to reduce the effects of pulsation on said hub.

12. The mechanism set forth in claim 11 wherein said one of said rotary members is formed of a plastic material.

13. The mechanism set forth in claim 12 wherein the elements of said one of said rotary members are formed of a plurality of differing plastic materials integrated during the manufacture thereof.

14. A rotary motion transmitting mechanism comprising:

a first rotary member;

a second rotary member having an axis of rotation spaced from the axis of rotation of said first rotary member;

and a closed flexible loop of substantially fixed length interconnecting said rotary members to transmit the rotary motion of one of said rotary members to the other of said rotary members;

at least one of said rotary members having a hub, a rim, and at least one spiral member integral with said hub and said rim and wound therebetween and capable of radial deflection to permit eccentricity between said hub and said rim during rotation thereof;

and means connected to said hub for providing additional inertia thereto to reduce the effects of pulsation on said hub.

15. A rotary motion transmitting mechanism comprising:

a first rotary member;

a second rotary member having an axis of rotation spaced from the axis of rotation of said first rotary member;

and a closed flexible loop of substantially fixed length interconnecting said rotary members to transmit the rotary motion of one of said rotary members to the other of said rotary members;

at least one of said rotary members having a hub, a rim, and a plurality of spiral spoke members integral with said hub and said rim and wound therebetween, said spoke members being capable of radial deflection to permit eccentricity between said hub and said rim during rotation thereof;

and means connected to said hub for providing additional inertia thereto to reduce the effects of pulsation on said hub.

16. A rotary motion transmitting mechanism comprising:

a first rotary member;

a second rotary member having an axis of rotation spaced from the axis of rotation of said first rotary member;

a closed flexible loop of substantially fixed length interconnecting said rotary members to transmit the rotary motion of one of said rotary members to the other of said rotary members;

at least one of said rotary members having a hub, a rim, and a resilient connection between said hub and said rim to permit eccentricity between said hub and said rim during rotation thereof;

damping means between said hub and said rim and operable to absorb vibrations therein;

and means connected to said hub for providing additional inertia thereto to reduce the effects of pulsation on said hub.

17. The mechanism set forth in claim 16 wherein said damping means includes an elongate member secured to said hub and extending radially outwardly therefrom, and friction means secured in said rim and engaging said elongate member.

18. The mechanism set forth in claim 16 wherein said one of said rotary members is formed of a plastic material.

19. The mechanism set forth in claim 16 wherein the elements of said one of said rotary members are formed of a plurality of differing plastic materials integrated during the manufacture thereof.

20. A rotary motion transmitting mechanism comprising:

a first rotary member;

a second rotary member having an axis of rotation spaced from the axis of rotation of said first rotary member;

a closed flexible loop of substantially fixed length interconnecting said rotary members to transmit the rotary motion of one of said rotary members to the other of said rotary members;

at least one of said rotary members having a hub, a rim, and means integral with said hub and said rim and capable of radial deflection to permit eccentricity between said hub and said rim during rotation thereof;

damping means between said hub and said rim and operable to absorb vibrations therein;

and means connected to said hub for providing additional inertia thereto to reduce the effects of pulsation on said hub.

21. The mechanism set forth in claim 20 wherein said damping means includes an elongate member secured to said hub and extending radially outwardly therefrom, and friction means secured in said rim and engaging said elongate member.

22. The mechanism set forth in claim 21 wherein said resilient connection between said hub and said rim includes a plurality of circumferentially spaced spiral spokes integral with said hub and said rim and wound therebetween.

23. A rotary motion transmitting mechanism comprising:

a first rotary member;

a second rotary member having an axis of rotation spaced from the axis of rotation of said first rotary member;

a closed flexible loop of substantially fixed length interconnecting said rotary members to transmit the rotary motion of one of said rotary members to the other of said rotary members;

at least one of said rotary members having a hub, a rim, and at least one spiral member integral with said hub and said rim and wound therebetween and capable of radial deflection to permit eccentricity between said hub and said rim during rotation thereof;

damping means between said hub and said rim and operable to absorb vibrations therein;

and means connected to said hub for providing additional inertia thereto to reduce the effects of pulsation on said hub.

24. The mechanism set forth in claim 23 wherein said damping means includes an elongate member secured to said hub and extending radially outwardly therefrom, and friction means secured in said rim and engaging said elongate member.

25. The mechanism set forth in claim 24 wherein said resilient connection between said hub and said rim includes a plurality of circumferentially spaced spiral spokes integral with said hub and said rim and wound therebetween.

26. A rotary motion transmitting mechanism comprising:

a first rotary member;

a second rotary member having an axis of rotation spaced from the axis of rotation of said first rotary member;

a closed flexible loop of substantially fixed length interconnecting said rotary members to transmit the rotary motion of one of said rotary members to the other of said rotary members;

at least one of said rotary members having a hub, a rim, and a plurality of spiral spoke members integral with said hub and said rim and wound therebetween, said spoke members being capable of radial deflection to permit eccentricity between said hub and said rim during rotation thereof;

damping means between said hub and said rim and operable to absorb vibrations therein;

and means connected to said hub for providing additional inertia thereto to reduce the effects of pulsation on said hub.

27. The mechanism set forth in claim 26 wherein said damping means includes an elongate member secured to said hub and extending radially outwardly therefrom, and friction means secured in said rim and engaging said elongate member.

28. The mechanism set forth in claim 26 wherein said resilient connection between said hub and said rim includes a plurality of circumferentially spaced spiral spokes integral with said hub and said rim and wound therebetween.

29. A rotary motion transmitting mechanism comprising:

a first rotary member;

a second rotary member having an axis of rotation spaced from the axis of rotation of said first rotary member;

means interconnecting said rotary members to transmit the rotary motion of one of said rotary members to the other of said rotary members;

at least one of said rotary members having a hub, a rim, and a resilient connection between said hub and said rim to permit eccentricity between said hub and and said rim during rotation thereof;

damping means between said hub and said rim and operable to absorb vibrations therein;

and means connected to said hub for providing additional inertia thereto to reduce the effects of pulsation on said hub.

30. The mechanism set forth in claim 29 wherein said resilient connection between said hub and said rim includes a plurality of circumferentially spaced spiral spokes integral with said hub and said rim and wound therebetween.

31. The mechanism set forth in claim 30 wherein said means interconnecting said rotary members includes a closed flexible loop of substantially fixed length.

32. The mechanism set forth in claim 31 wherein said one of said rotary members is formed of a plastic material.

33. The mechanism set forth in claim 32 wherein said means for providing additional inertia includes a weight secured to said elongate member and spaced radially outwardly from said hub.

34. An internal combustion engine having a crankshaft, a camshaft spaced from and generally parallel to said crankshaft, a rotary member connected to said crankshaft, a rotary member connected to said camshaft, and a closed loop of substantially fixed length interconnecting said rotary members to transmit rotary motion of one to the other, at least one of said rotary members having a hub, a rim, and a plurality of circumferentially spaced spiral spokes wound between said hub and said rim and integral therewith, said spokes being capable of radial deflection to permit eccentricity between said hub and said rim and thereby allow for any variation in the spacing between said crankshaft and said camshaft.

35. The internal combustion engine set forth in claim 34 and further includes damping means between said hub and said rim to absorb torsional vibrations therein.

36. The internal combustion engine set forth in claim 35 wherein said damping means includes an elongate member secured to said hub and extends radially outwardly therefrom, and friction means secured in said rim and engaging said elongate member.

37. The internal combustion engine set forth in claim 34 and further including means connected to said hub for providing additional inertia thereto to reduce the effects of pulsations on said camshaft.

38. The internal combustion engine set forth in claim 37 wherein said means connected to said hub includes an engine accessory.

References Cited by the Examiner

UNITED STATES PATENTS

| | | | |
|---|---|---|---|
| 504,588 | 9/1893 | Johnson | 74—230.4 |
| 650,264 | 5/1900 | Moss | 74—230.4 |
| 1,495,181 | 5/1924 | Holzhausen | 64—27 |
| 2,615,316 | 10/1952 | Kirwin | 74—230.01 |
| 3,200,659 | 8/1965 | Angelini | 74—219 |

FOREIGN PATENTS 963,346  12/1949  France.

MARK NEWMAN, *Primary Examiner.*

KARL J. ALBRECHT, CARLTON R. CROYLE,
*Examiners.*

A. L. SMITH, *Assistant Examiner.*